United States Patent [19]

Peacock

[11] Patent Number: 5,069,159
[45] Date of Patent: Dec. 3, 1991

[54] MILK HOSE SUPPORT

[76] Inventor: Steve N. Peacock, 2204 Anthony Dr., Anthony, N. Mex. 88021

[21] Appl. No.: 565,030

[22] Filed: Aug. 9, 1990

[51] Int. Cl.$^5$ .............................................. A01J 7/00
[52] U.S. Cl. ..................................... 119/14.1; 248/278
[58] Field of Search ............................. 119/14.1, 14.12; 248/278, 282

[56] References Cited

U.S. PATENT DOCUMENTS

| | | | |
|---|---|---|---|
| 3,938,470 | 2/1976 | Pace | 119/14.1 |
| 3,962,575 | 6/1976 | Vandenberg | 119/14.1 |
| 4,183,489 | 1/1980 | Copher | 248/278 |
| 4,586,462 | 5/1986 | Icking | 119/14.1 |

Primary Examiner—John G. Weiss
Attorney, Agent, or Firm—Shoemaker and Mattare

[57] ABSTRACT

A device for supporting a milking hose during milking operations, comprises a base, a first arm connected at one end to the base by a first friction pivot permitting the arm to rotate about a first axis, and a knuckle connected to the other end of the first arm. The knuckle, formed from a pair of pivots interconnected at right angles, supports a second arm having a fork at its upper end for supporting the milking hose. The position of the fork can be adjusted in at least two directions with respect to the base.

4 Claims, 2 Drawing Sheets

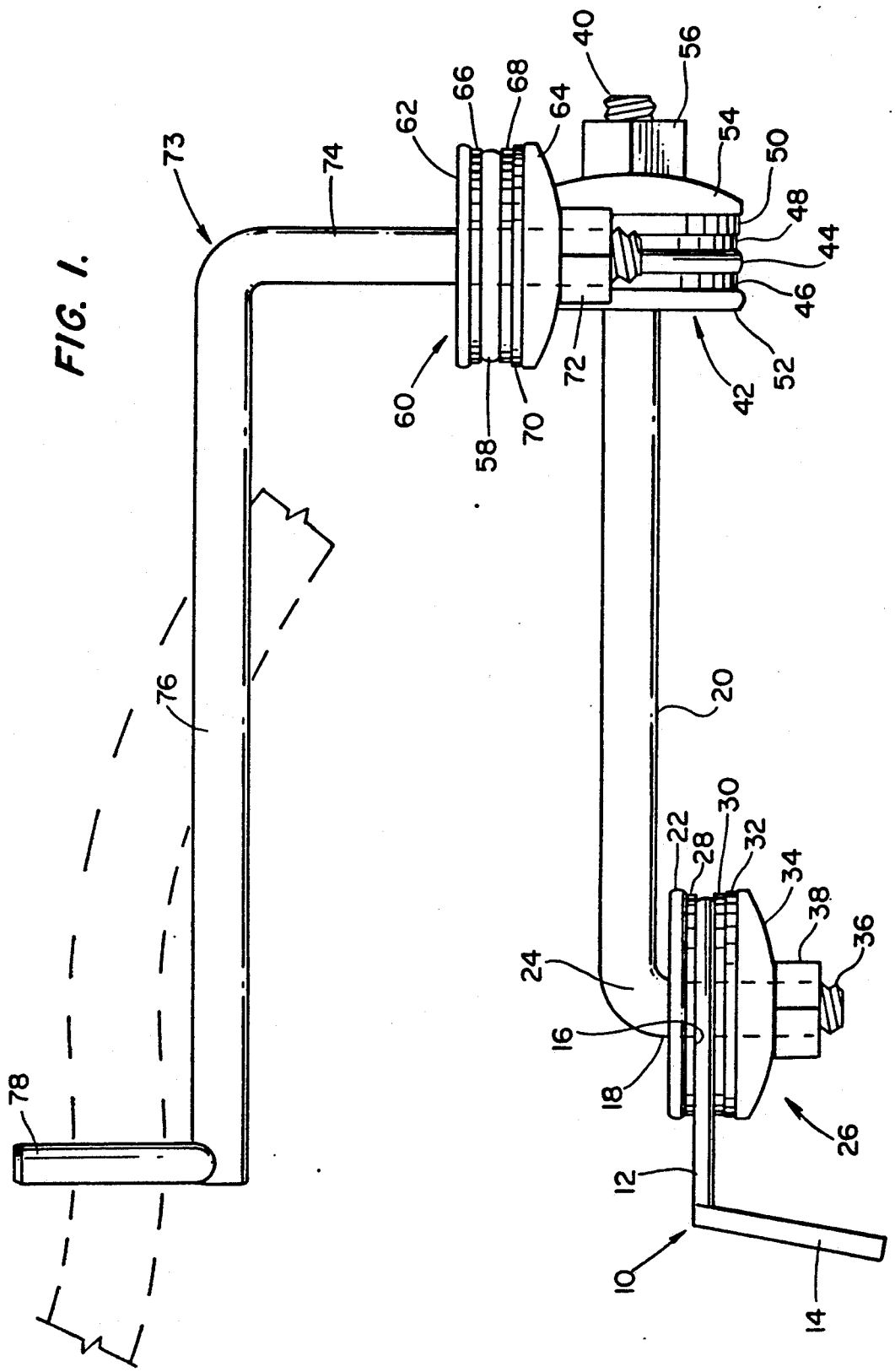

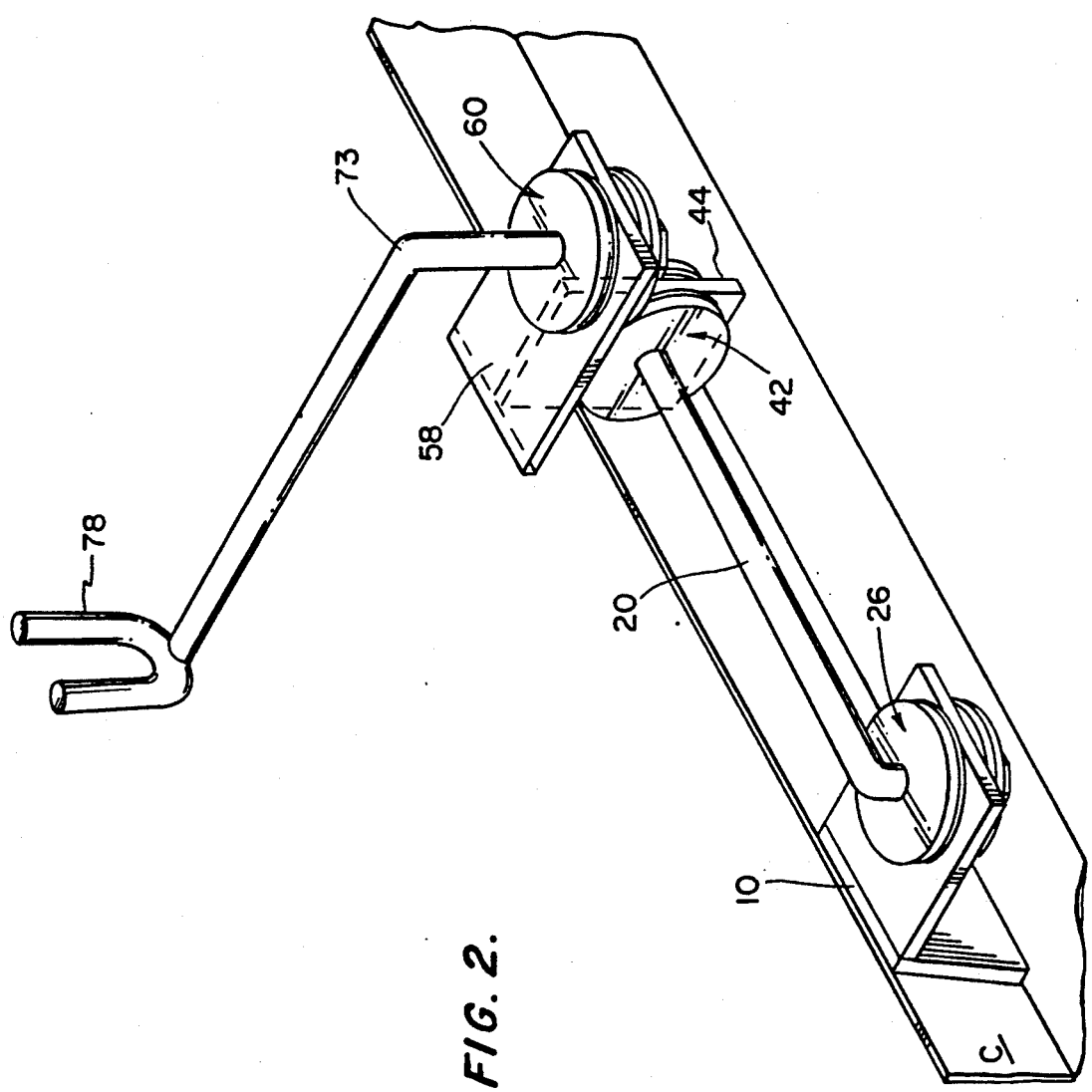

MILK HOSE SUPPORT

BACKGROUND OF THE INVENTION

This invention relates generally to dairy equipment, and more particularly to a device for supporting a milking hose while a cow is being milked.

In a milking barn, where cows are placed in parallel stalls for milking, the milking equipment is usually located directly behind each cow, so that the most direct access to the udder is from behind, between the cow's legs. Milking is done by four suction milkers supported by a common fixture called a "claw", which is installed on the udder manually. The weight of the claw is supported by suction on the udder; however, the substantial weight of the full milking hose leading from the claw, and air lines running parallel to the milking line, add to the effective weight of the claw; these, plus pulling forces on the hose, may dislodge the claw from its proper position. Should the position of the claw be disturbed, the milkers may operate unevenly, so that some quarters of the udder may be overmilked, and others not emptied. The problems of hose line tension and weight could be minimized or eliminated by supporting the hose independently, near the claw. There is therefore a need for a device which will support a milk line while a cow is being milked.

Recognizing this need, some dairymen have rigged simple clamps to the "curb" that runs behind the cows at the rear of the stalls, to support or position the hose. Such items are not fully satisfactory, because they are not adjustable, and thus they may not relieve the problems of milk line loading on the claw in many situations.

SUMMARY OF THE INVENTION

In view of the foregoing, it is any object of this invention to provide the dairy industry with a fully adjustable milk line support device.

Another object is to permit such a device to be readily installed on existing curbs in milking barns.

A further object is to provide a milk hose support of simple and sturdy construction, which will withstand years of rough usage without deterioration in performance.

Still another object is to support a milk hose at a position as close to beneath the cow, that is, as far from the curb, as possible, so as to support a great portion of the weight of the hose.

These and other objects of the invention are attained by a milk hose support including a base for connection to a standard curb, a lower horizontal arm supported on the base by a first pivot, said pivot supporting the arm at one end and permitting the arm to pivot with respect to the base around a substantially vertical axis, and a second arm pivotally supported at the free end of the first arm by a knuckle permitting the second arm to rotate about the knuckle in two directions. A fork at the upper end of the second arm supports a milking hose.

BRIEF DESCRIPTION OF THE DRAWINGS

In the accompanying drawings,

FIG. 1 is a side elevation of a milk hose support embodying the invention; and

FIG. 2 is an isometric view of the device shown in FIG. 1.

DESCRIPTION OF THE PREFERRED EMBODIMENT

Referring to FIGS. 1-2, a milk hose support embodying the invention includes a base 10 having a horizontal plate 12 welded to a mounting plate 14 that is slightly oblique to the vertical, in correspondence with the angularity of common curbing C, shown in FIG. 2. The horizontal plate has a hole 16 through which extends the short vertical leg 18 of a lower arm 20. A stainless steel washer 22 is welded to the lower arm, just below its elbow 24. A first pivot 26 is formed by inserting an upper friction fiber washer 28 between the plate 12 and the washer 22, and adding a lower friction washer 30, a rubber grommet 32, and a stainless steel cone washer 34 beneath the plate 12. The lower arm is threaded at 36, and a lock nut 38 installed on the threads is tightened to provide a desired degree of resistance to arm movement.

The far (distal) end of the lower arm is also threaded, at 40, and in like manner supports a second pivot 42 containing a central plate 44 sandwiched between friction washers 46 and 48, a rubber grommet 50, and stainless steel washers 52 and 54, compressed by a lock nut 56.

The plate 44 of the second pivot is connected by welding to a corresponding plate 58 of a third pivot 60, again comprising washers 62 and 64, friction washers 66 and 68, a grommet 70 and a lock nut 72.

The third pivot 60 supports the lower end of an upper arm 73. This arm has a vertical leg 74, which extends upward from the third pivot, and a horizontal leg 76 having a fork 78 at its distal end to support a milk hose, shown in broken lines in FIG. 1.

Each of the pivots is tightened so that the arms are maintained in any position at which they are set, but can be moved as desired. The first pivot permits the lower arm to rotate about a fixed vertical axis passing through the pivot. The second and third pivots permit the upper arm to rotate about both vertical and horizontal axes with respect to the first arm. As a result, the position of the fork can be adjusted toward and away from the cow, and laterally of the cow.

Once the milk support device has been attached to the curb of the milk barn, the arms can be rotated as desired to support the milk hose close to the cow. With the device positioned as in FIG. 1, the fork 78 is generally over the curb; however, it can be moved substantially closer to the cow, as shown in FIG. 2. Thus supported, the hose is much less likely to dislodge the claw from its proper position on the udder. As a consequence, the incidence of improper milking is reduced.

Inasmuch as the invention is subject to modifications and variations, it is intended that the foregoing description and the accompanying drawings shall be interpreted as illustrative of only one form of the invention, whose scope is to be measured by the following claims.

I claim:

1. A device for supporting a milking hose on a dairy stall curb during milking operations, comprising
   a base,
   means for connecting the base to the curb,
   a first arm connected to the base by a first friction pivot permitting the arm to rotate about a single first axis, said pivot supporting one end of the first arm, a knuckle connected to the other end of the first arm, said knuckle comprising a second pivot and a third pivot connected at right angles, and a second arm having a first end supported by said knuckle, and a second end having thereon a fork for supporting the milking hose, whereby the position of the hose supporting means can be adjusted in at least two directions with respect to the base.

2. The invention of claim 1, wherein each of said pivots comprises a plate, a pair of friction washers bearing against opposite sides of said plate, and means for forcing said friction washers against said plate.

3. The invention of claim 2, wherein a threaded end of one of said arms extends through each pivot, and the forcing means comprises a flat washer affixed to the arm adjacent one of the friction washers, a grommet bearing against the other of the friction washers, a cone washer against the grommet, and a nut on the threaded rod end for compressing the pivot.

4. The invention of claim 3, wherein the plates of said second and third pivots are welded together to form said knuckle.

* * * * *